United States Patent
Johnson et al.

(10) Patent No.: US 8,799,697 B2
(45) Date of Patent: Aug. 5, 2014

(54) OPERATING SYSTEM SYNCHRONIZATION IN LOOSELY COUPLED MULTIPROCESSOR SYSTEM AND CHIPS

(75) Inventors: Paul R. Johnson, San Diego, CA (US); Gabriel A. Watkins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 13/289,706

(22) Filed: Nov. 4, 2011

(65) Prior Publication Data
US 2013/0080816 A1    Mar. 28, 2013

Related U.S. Application Data

(60) Provisional application No. 61/539,096, filed on Sep. 26, 2011.

(51) Int. Cl.
*G06F 1/12* (2006.01)
*G06F 1/32* (2006.01)
*G06F 9/52* (2006.01)

(52) U.S. Cl.
CPC .............. *G06F 1/3206* (2013.01); *G06F 9/52* (2013.01)
USPC ............................ 713/401; 713/300; 713/502

(58) Field of Classification Search
CPC ............ G06F 1/3203; H04W 52/0216; Y02B 60/1278
USPC ......... 710/300, 310, 320, 323, 330, 401, 502; 370/311, 341
See application file for complete search history.

(56) References Cited

U.S. PATENT DOCUMENTS

| | | | | |
|---|---|---|---|---|
| 5,924,017 A | * | 7/1999 | Pinter et al. | 340/7.36 |
| 6,128,747 A | * | 10/2000 | Thoulon | 713/330 |
| 6,741,836 B2 | * | 5/2004 | Lee et al. | 455/41.2 |
| 6,892,315 B1 | * | 5/2005 | Williams | 713/502 |
| 7,062,303 B2 | * | 6/2006 | Guterman | 455/574 |
| 7,079,811 B2 | * | 7/2006 | Lee et al. | 455/41.2 |
| 7,451,333 B2 | * | 11/2008 | Naveh et al. | 713/323 |
| 7,689,839 B2 | * | 3/2010 | Uguen et al. | 713/300 |
| 7,765,352 B2 | * | 7/2010 | Pudipeddi et al. | 710/261 |
| 8,028,185 B2 | * | 9/2011 | Branover et al. | 713/330 |
| 8,045,494 B2 | * | 10/2011 | Habetha et al. | 370/311 |

(Continued)

FOREIGN PATENT DOCUMENTS

WO    2007077516 A1    7/2007

OTHER PUBLICATIONS

Martinez et al. The Thrifty Barrier: Energy-Aware Synchronizaiton in Shared-Memory Multiprocessors. Feb. 2004.*

(Continued)

*Primary Examiner* — Matthew D Spittle
(74) *Attorney, Agent, or Firm* — Nicholas A. Cole

(57) ABSTRACT

Methods, systems and devices configured to add synchronization to the entry and exit from low power modes in asynchronous operating systems on a multiprocessor system. A synchronizing agent tracks the requested sleep and wake up times of the different asynchronous operating systems executing on different cores of the same system on chip or multicore processor. The sleep/wake up times of some cores/operating systems may be delayed in order to synchronize the sleep/wake up times of two or more of the asynchronous operating systems executing on the multiprocessor system.

44 Claims, 5 Drawing Sheets

(56) References Cited

U.S. PATENT DOCUMENTS

| | | | | |
|---|---|---|---|---|
| 8,090,963 | B2* | 1/2012 | Adams et al. | 713/300 |
| 8,112,647 | B2* | 2/2012 | Branover et al. | 713/320 |
| 8,661,272 | B2* | 2/2014 | Adams et al. | 713/300 |
| 8,726,048 | B2* | 5/2014 | Naveh et al. | 713/300 |
| 2008/0025279 | A1* | 1/2008 | Young et al. | 370/341 |
| 2009/0235260 | A1* | 9/2009 | Branover et al. | 718/102 |
| 2011/0239011 | A1* | 9/2011 | Waris et al. | 713/310 |
| 2012/0166845 | A1* | 6/2012 | Henry et al. | 713/323 |
| 2014/0068303 | A1* | 3/2014 | Hildebrand et al. | 713/323 |

OTHER PUBLICATIONS

Wu et al. Energy Efficient Sleep/Wake Scheduling for Multi-hp Sensor Networks: Non-convexity and Approximation Algorithm. IEEE. 2007.*

Lee, Ming-Chao, et al.; "Efficient Wake-up Scheduling for Multi-Core Systems"; 18th ACM/IEEE International Workshop on Timing Issues; United States; Mar. 31, 2011.

Aalto A "Dynamic management of multiple operating systems in an embedded multi-core environment",May 7, 2010, XP055045411, [retrieved on Nov. 23, 2012].

International Search Report and Written Opinion—PCT/US2012/055756—ISA/EPO—Dec. 12, 2012.

McCammon R "Better Multicore Energy Conservation on Mobile Devices with Virtualization", Dr. Dobb's, May 17, 2011, XP055045470, Retrieved from the Internet:URL: http://www.drdobbs.com/mobile/better-multicore-energy-conservation-on/229500748 [retrieved on Nov. 23, 2012].

Mukherjee A et al., "Multi-Core Embedded Systems—Chapter 10" In: "Multi-Core Embedded Systems—Chapter 10", Apr. 7, 2010, CRC Press, XP055045434, pp. 337-368, DOI: 10.1201/9781439811627-c10.

* cited by examiner

OPERATING SYSTEM SYNCHRONIZATION IN LOOSELY COUPLED MULTIPROCESSOR SYSTEM AND CHIPS

RELATED APPLICATIONS

This application claims the benefit of priority to U.S. Provisional Patent Application No. 61/539,096 entitled "Operating System Synchronization in Loosely Coupled Multiprocessor System-on-Chips" filed Sep. 26, 2011, the entire contents of which are hereby incorporated by reference.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. For example, mobile electronic devices now commonly include system-on-chips (SoCs) and/or multiple microprocessor cores embedded on a single substrate, allowing mobile device users to execute complex and power intensive software applications on their mobile devices. As a result, a mobile device's battery life and power consumption characteristics are becoming ever more important considerations for consumers of mobile devices.

SUMMARY

The various aspects include methods of conserving energy in multicore and multiprocessor computing devices that may include determining when the operating system of a processor can enter a low power mode, calculating a preferred wake up time when the operating system can enter a low power mode, sending the calculated preferred wake up time to a synchronizing agent, computing in the synchronizing agent a minimum wake-time value that is greater than or equal to the preferred wake up time, receiving the minimum wake-time value from the synchronizing agent, computing a delay associated with the difference between the preferred wake up time and the minimum wake-time, informing the synchronizing agent if the delay is acceptable to the operating system's functional performance, setting a wake time of the operating system to the minimum wake-up time if the delay is acceptable to the operating system's functional performance and entering a low power mode for the minimum wake-up time.

In an aspect, the method may include receiving instructions from the synchronizing agent to set the wake time to an alternative minimum wake-up time if the delay associated with the computed difference is not acceptable to the operating system's functional performance. In a further aspect, setting the wake time to the minimum wake-up time may synchronize the wake up times of different asynchronous operating systems executing on different cores on a multicore processor. In an aspect, each core of the multicore processor may operate under a different operating system than each of the other cores the multicore processor. In an aspect, each core of the multicore processor may share at least one resource that binds the core to operations of at least one other core. In an aspect, setting the wake time to the minimum wake-up time may synchronize the wake up times of different asynchronous operating systems executing on different processors of a system-on-chip. In an aspect, each of the processors of the system-on-chip may operate under a different operating system than each of the other cores the processors. In an aspect, each of the processors of the system-on-chip may share at least one resource that binds the processor to operations of at least one other processor. In an aspect, a single synchronizing agent may synchronize the wake up times for each of the processors of the system-on-chip. In a further aspect, the synchronizing agent may be executed on a dedicated resource manager processor. In an aspect, the synchronizing agent may be distributed across two or more processors, and accesses a data structure shared by the two or more processors.

Further aspects include a multiprocessor device that includes two or processor cores in which at least one processor core is configured with processor-executable instructions to perform operations of the aspect methods described above. Further aspects include a multiprocessor device that includes a means for performing functions of operations of the aspect methods described above. Further aspects include a non-transitory processor-readable storage medium having stored thereon processor-executable software instructions configured to cause a processor of a multiprocessor device to perform operations of the aspect methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
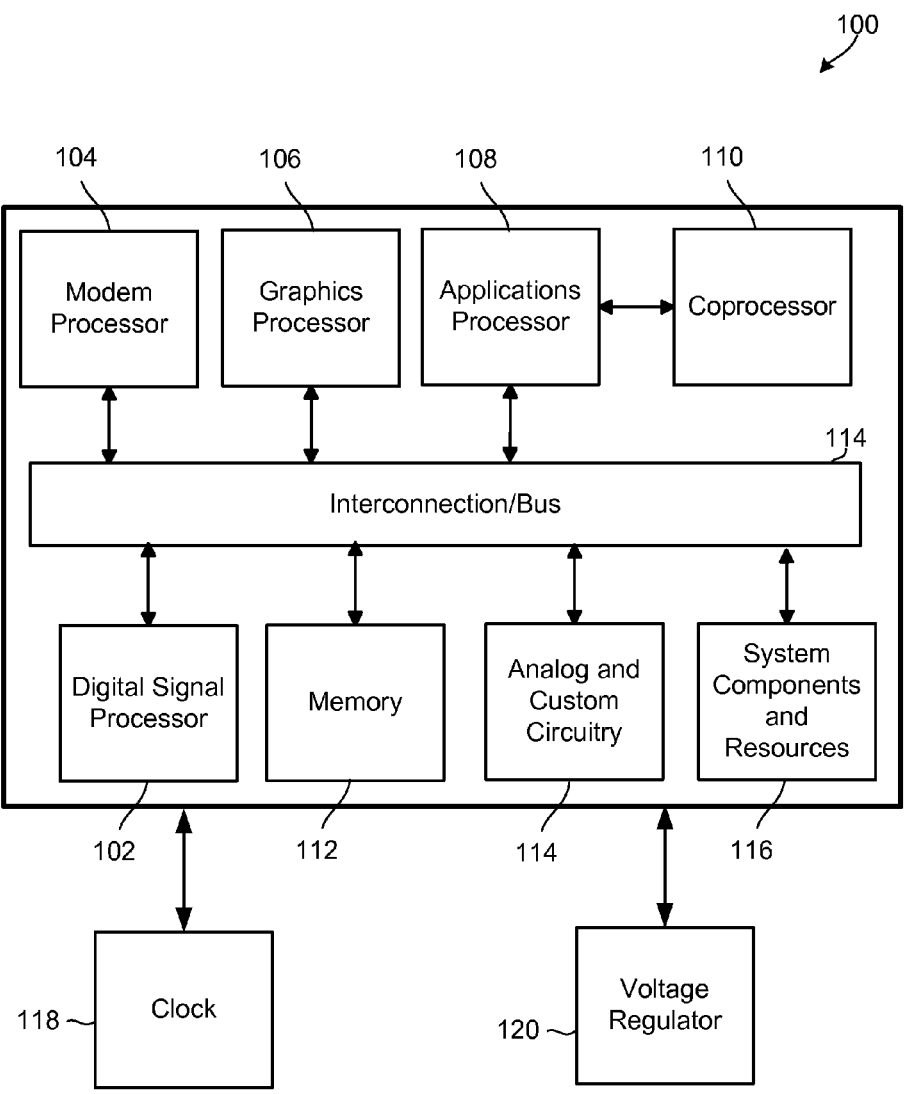
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of cellular telephones, laptop computers, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and operate under battery power such that power conservation methods are of benefit.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (DSP, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. A SOC may include multiple multicore processors, and each processor in an SOC may be referred to as a core.

The term "resource" is used herein to refer to any of a wide variety of circuits (e.g., ports, clocks, buses, oscillators, etc.), components (e.g., memory), signals (e.g., clock signals), and voltages (e.g., voltage rails) which are used to support processors and clients running on a computing device. A mobile computing device typically includes a number of resources, such as a crystal oscillator, voltage rails, one or more memory units, communication busses, etc.

The term "absolute time" is used herein to refer to a time relative to some agreed global reference (e.g., counter, time standard, coordinated universal time, etc.).

The term "relative time" is used herein to refer to a time that is an offset from another time value that is not the global reference.

The various aspects provide improved methods for conserving power in asynchronous multiprocessor systems (e.g., system-on-chips, multicore processors, etc.) having multiple processors/cores, each of which may execute a different operating system. The various aspects cause the different operating systems to wake up at the same time, reducing the total number of transitions out of low power states and improving the energy consumption characteristics of the hardware. The aspects include methods for conserving power in a system-on-chip (SoC) hardware having multiple processor cores, each of which may execute a different operating system. Each operating system may notify a synchronizing agent (e.g., a resource manger) when they are entering a low power state (e.g., are idle) and when they desire to be woken up from the low power state (e.g., in 1 second). The synchronizing agent may coordinate the wake up times, such as by overriding the requested wake up time of one or more of the operating systems so that all the operating systems wake up at the same time. In an aspect the synchronizing agent may be a process executing on the multiprocessor device. In an aspect the synchronizing agent may be part of the operating system.

In an aspect there may be a single synchronizing agent for an entire system-on-chip (SoC). In an aspect, the primary role of the synchronizing agent may be to remain cognizant of the wake-up times of all the processors/cores in the SoC and perform operations to synchronize them. In an aspect synchronizing agent may reside in a dedicated resource manager processor on the SoC. In another aspect, the resource manager may be a data structure shared among all the processors/cores in the system. The synchronizing agent may be distributed among all the processors/cores.

The various aspects may add a measure of synchronization in what would otherwise be an unsynchronized system. By forcing the operating systems to wake up at the same time, the aspects may reduce the total number of transitions out of the global low power state. By adjusting the wake up time of those cores which have tolerance in their wake up times, the resource manager can synchronize the sleep and wake up operations which maximizing achievable power savings in any one sleep cycle. Since a significant amount of energy is lost each time the SoC exists the global low power state (e.g., wakes up), reducing the number of wakeups also reduces the total amount of energy consumed by the SoC.

As mentioned above, a mobile device's battery life and power consumption characteristics are important considerations for consumers of mobile devices. A mobile computing device typically includes a number of resources that may be placed in a low power mode, such as a crystal oscillator, voltage rails, one or more memory units, communication busses, etc. To maximize battery life, mobile devices may be configured to place such resources or processors/cores in a low power state whenever possible. For example, a mobile device processor may turn off, disable, idle, or otherwise reduce the energy consumption needs of a resource when the processor no longer needs the resource, such as when the processor enters a stable idle state. When the processor "wakes up" (e.g., leaves the idle state to perform another process), the resources are turned back on, re-enabled and/or returned to an acceptable operating state.

Modern computing devices now include multiple processors/cores on a single chip, each of which may execute a different operating system. Each processor/core may have different sets of constraints, workloads and different times that they are expected to enter and exit a low power/sleep mode (i.e., each core may be required to enter and exit sleep mode independent of the other cores). Each of the processing units/cores may also share resources that bind them to the operations/states of the other cores. For example, a multicore processor/SOC may have four cores that can theoretically enter a low power/sleep mode independently, but are bound to the operations of a root crystal oscillator and/or voltage rail that cannot be shut down unless all the cores are in a low power mode. The sharing of such resources between processors/cores having independent operating systems complicates the implementation of power saving strategies.

FIG. 1 is an architectural diagram illustrating an example system-on-chip (SOC) 100 architecture that may be used to implement the various aspects. The SOC 100 may include a number of heterogeneous processors, such as a digital signal processor (DSP) 102, a modem processor 104, a graphics processor 106, and an application processor 108, each of which may include one or more cores. The SOC may also include one or more coprocessors (e.g., vector co-processor) 110 connected to one or more of the processors. Each processor may include one or more cores, and each processor/core may perform operations independent of the other processors/cores. For example, the SOC 100 may include a processor that executes a UNIX based operating system (e.g., FreeBSD, LINIX, OS X, etc.) and processor that executes a windows based operating system (e.g., Microsoft Windows 7).

The SOC 100 may also include analog circuitry and custom circuitry 114 for managing sensor data, analog-to-digital conversions, wireless data transmissions, and performing other specialized operations, such as processing encoded audio signals for games and movies. The SOC may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication units, external memory chips, etc. The processors 102, 104, 106, 108 may be interconnected to one or more memory elements 112, system components, and resources 116 and custom circuitry 114 via an interconnection/bus module, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.). In the various aspects, the relationships between the internal SOC processors/cores and the external resources may be maintained and managed by the SOC for entering a global low power state.

Figure 2:
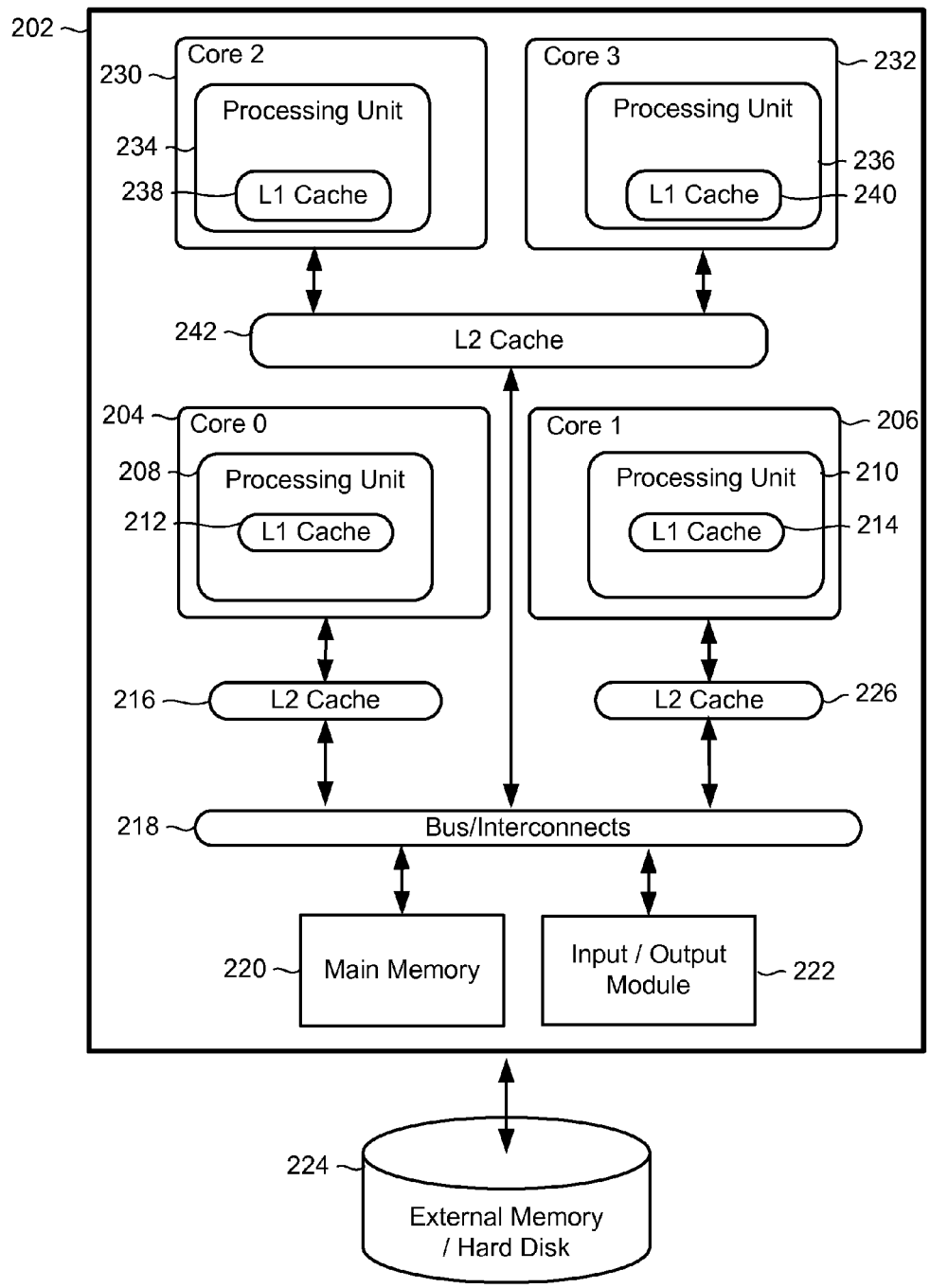
FIG. 2 is an architectural diagram of an example multicore processor suitable for implementing the various aspects.

FIG. 2 is an architectural diagram illustrating an example multicore processor architecture that may be used to implement the various aspects. As mentioned above, a multicore processor 202 may include two or more independent processing cores 204, 206, 230, 232 in close proximity (e.g., on a single substrate, die, integrated chip, etc.). The proximity of the processors/cores allows memory to operate at a much higher frequency/clock-rate than is possible if the signals have to travel off-chip. Moreover, the proximity of the cores allows for the sharing of on-chip memory and resources, as well as for more coordinated cooperation between cores.

The multicore processor 202 may include a multi-level cache that includes Level 1 (L1) caches 212, 214, 238, 240 and Level 2 (L2) caches 216, 226, 242. The multicore processor 202 may also include a bus/interconnect interface 218, a main memory 220, and an input/output module 222. The L2 caches 216, 226, 242 may be larger (and slower) than the L1 caches 212, 214, 238, 240 but smaller (and substantially faster) than a main memory unit 220. Each processing core 204, 206, 230, 232 may include a processing unit 208, 210, 234, 236 that has private access to an L1 cache 212, 214, 238, 240. The processing cores 204, 206, 230, 232 may share access to an L2 cache (e.g., L2 cache 242) or may have access to an independent L2 cache (e.g., L2 cache 216, 226).

The L1 and L2 caches may be used to store data frequently accessed by the processing units, whereas the main memory 220 may be used to store larger files and data units being accessed by the processing cores 204, 206, 230, 232. The multicore processor 202 may be configured such that the processing cores 204, 206, 230, 232 seek data from memory in order, first querying the L1 cache, then L2 cache, and then the main memory if the information is not stored in the caches. If the information is not stored in the caches or the main memory 220, multicore processor 202 may seek information from an external memory and/or a hard disk memory 224.

The processing cores 204, 206, 230, 232 may communicate with each other via a bus/interconnect 218. Each processing core 204, 206, 230, 232 may have exclusive control over some resources and share other resources with the other cores.

The processing cores 204, 206, 230, 232 may be identical to one another, heterogeneous, and/or implement different specialized functions. Thus, processing cores 204, 206, 230, 232 need not be symmetric, either from the operating system perspective (e.g., may execute different operating systems) or from the hardware perspective (e.g., may implement different instruction sets/architectures). In an aspect, processing cores that share an L2 cache (e.g., processing cores 230 and 232) may be homogeneous and managed by one type of operating system, whereas processing cores that have access to a separate L2 cache (e.g., processing cores 204 and 206) may be heterogeneous and managed by one or more different types operating systems). In an aspect, the multicore processor 202 may be heterogeneous (e.g., include at least one core that is not identical to the other cores).

As discussed above, multiprocessor hardware (e.g., SOCs, multicore processors, etc.) designs are becoming ever more common and may involve placing multiple processor cores of different capabilities inside the same package, often on the same piece of silicon. Symmetric multiprocessing hardware includes two or more identical processors connected to a single shared main memory that are controlled by a single operating system. Asymmetric or "loosely-coupled" multiprocessing hardware may include two or more heterogeneous processors/cores that are each controlled by an independent operating system and connected to one or more shared memories/resources. For example, a loosely-coupled multicore processor may include two or more cores, each having its own software operating system that operates independent of the other cores/operating systems. Data may be shared between the cores/processors via one or more shared memories.

The inclusion of multiple cores on a single chip, and the sharing of memory, resources, and power architecture between cores, gives rise to a number power management issues not present in more distributed multiprocessing systems. Therefore, a different set of design constraints must be considered when designing power management strategies for multicore processors and systems-on-chip than when designing power management strategies for the other, more distributed, multiprocessing systems.

Each core in a loosely-coupled multiprocessor typically implements a power savings scheme that allows the core to enter a low power state when it is not executing code (referred to as a "core-local" low power state). When all cores are in a low power state, the multiprocessor hardware (SOC, multicore processor) may enter an even lower power state, referred to as a "global" low power state. There may be more than one global low power state for each multiprocessor and each processors/core may have a set of core-local low power states. In an aspect, the choice of core-local low power states entered by each processor/core may determine which of the global low power states may be entered. In an aspect, the multiprocessor system may be configured to keep the system in a selected global low power state as long as possible. Thus, it should be noted that in the various aspects, the processors/cores need not enter their lowest power state before the multiprocessor system enters a global low power state. In an aspect, during a sleep cycle, the choice of core-local low power states entered by each processor/core may determine which of the global low power states may be entered.

Power savings are maximized when the multiprocessor hardware is in the global low power state. However, the multiprocessor generally cannot enter the global low power state until all the processors and shared resources are in the correct states, and a degree of executive control/coordination between the cores is required. For example, a multiprocessor device may include two or more processors/cores that share resources (e.g., a voltage rail) that bind the processors/cores to the operations/states of the other processors/cores. The sharing of such resources generally means that multiprocessor may only enter the global low power state if all of the asynchronous operating systems are in a low power state or turned off.

The various aspects synchronize the operations of asynchronous operating systems of a multiprocessor such that the multiprocessor hardware may enter and remain in a global low power mode for longer periods of time, and such that all of the asynchronous operating systems on the multiprocessor cores may enter and exit a low power mode at the same time.

Every transition out of the global low power state incurs some energy consumption. The energy consumed by these transitions is unavoidable, and is generally caused by the physics of switching voltages and clocks inside the multiprocessor device. The various aspects minimize the number of transitions out of the global low power state by using a synchronizing agent (e.g., a resource manger) configured to track and coordinate the wake up times of different asynchronous operating systems executing on the same multiprocessor device. Each operating system may notify the synchronizing agent when they are entering a low power state (e.g., are idle) and when they desire to be woken up from the low power state (e.g., in 1 second). The synchronizing agent may coordinate the wake up times, such as by overriding the requested wake up time of one or more of the operating systems so that all the operating systems wake up at the same time.

The various aspects add a measure of synchronization in what would otherwise be an unsynchronized system. The various aspects force the operating systems to wake up at the same time, reducing the total number of transitions out of the global low power state. The various aspects identify cores that have some tolerance in their requested wake up times and adjust the wake up times of the cores to synchronize the sleep and wake up operations of two or more cores, maximizing achievable power savings in any one sleep cycle. Since a significant amount of energy is lost each time the device exists the global low power state (e.g., wakes up), reducing the number of wakeups also reduces the total amount of energy consumed by the multiprocessor device.

The various aspects also increase the probability that cores in a loosely-coupled multiprocessing device will wake at the same instant. The power consumed by wake-ups from the multiprocessor device global low power state is reduced because the overall number of required wake-ups is reduced. Also, the time that the multiprocessor device remains in a global low power state may be extended (consistent with tolerances on wake times of each core), further improving overall power consumption.

Generally, operating systems offer timer services that allow a client software application to request an event to occur at a specified time. When an operating system has no software to run or is waiting for some external event (e.g., is idle), but has a timer event scheduled to occur in the future, the operating system may program a timer hardware block to interrupt the core that will perform a scheduled task at the time requested by the client (referred to as time "T"), and place the core in a low power state until the expiration of the timer.

The various aspects modify the operating system's programming of the timer hardware block. When a particular core is ready to program its timer at time T, the operating system may first consult the synchronizing agent by querying the scheduled wake times of the other cores, referred to here as T1, T2, . . . Tn (assuming there are (n+1) cores in the system). The operating system may then determine the minimum wake-time (Ti) in the set {T1 . . . Tn} that is greater than or equal to T. The operating system may then compute the difference in the time requested (T) by the core and the determined minimum wake-time (Ti) to arrive at a delay value Td (i.e., T−Ti). If a delay of Td is acceptable to the operating system's functional performance, the agent may instruct the operating system to set its wake time to Ti instead of T. The operating system may then report its wake-time to the synchronizing agent.

Figure 3:
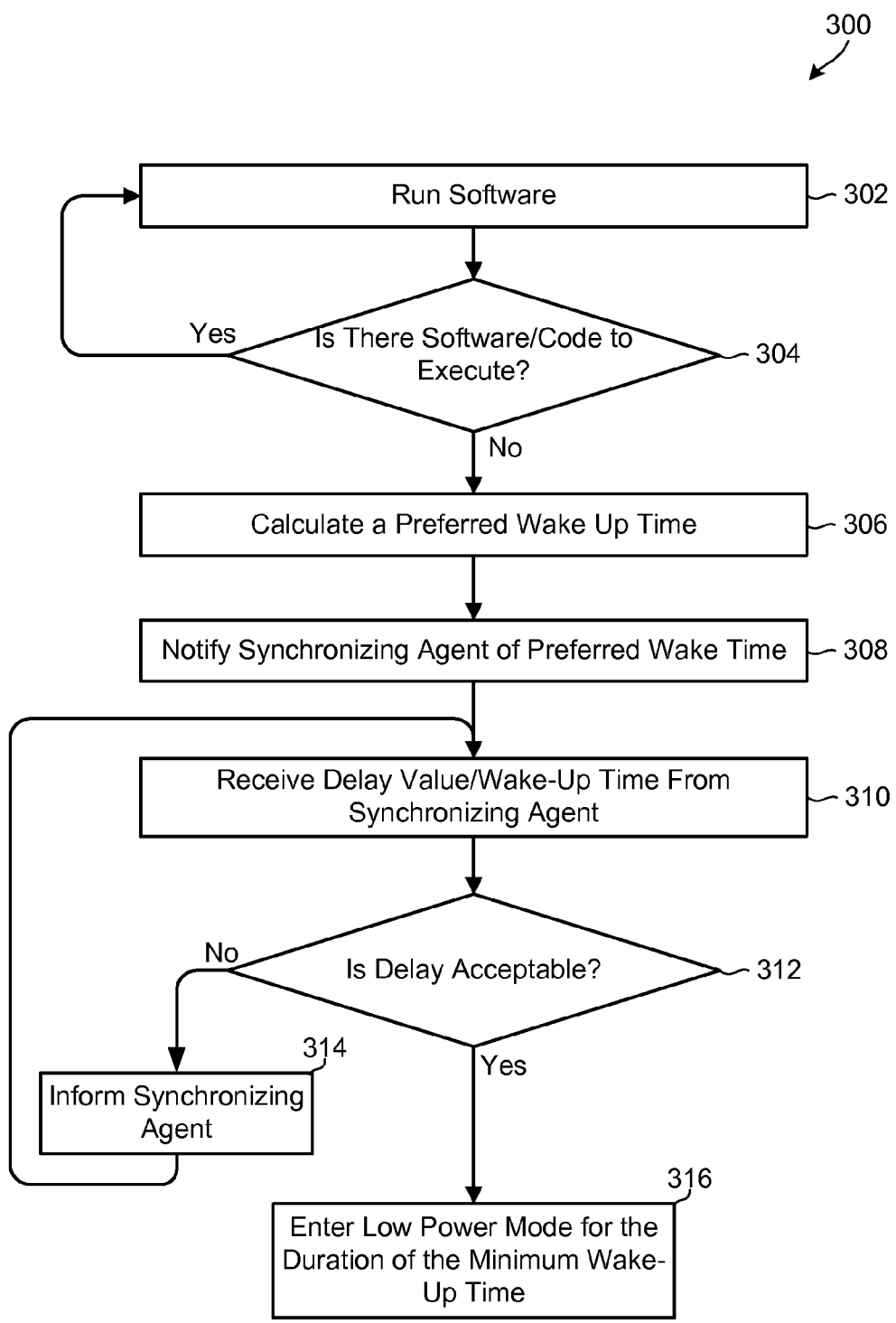
FIG. 3 is a process flow diagram of aspect operating system method for coordinating wake up times with other asynchronous operating systems executing on the same multiprocessor hardware.

FIG. 3 is a process flow diagram of an aspect operating system method 300 for coordinating wake up times with different asynchronous operating systems executing on the same SOC/multicore processor. In block 302, an asynchronous operating system of a SOC/multicore processor may execute software processes/tasks on a processor/core. In determination block 304, the operating system may determine whether there are other software processes/tasks to execute and/or whether there is a pause in the execution of software instructions (e.g., waiting for another processor or input source to respond). If there are other processes/tasks to execute (determination block 304="Yes"), the operating system may continue executing software in block 302. If there are no additional processes/tasks to execute or the processor is entering an idle state (determination block 304="No"), in block 306 the operating system may calculate a preferred wake up time (e.g., time T) at which the operating system desires to be woken up (e.g., receive an interrupt) from a low power mode.

In block 308, the operating system may notify a synchronizing agent of the calculated preferred wake time (e.g., T). In an aspect, the operating system may notify the synchronizing agent of a preferred wake up time (e.g., T) and a tolerance value (e.g., acceptable delay value). The synchronizing agent may use the combination of the wake up time and tolerance value, and/or query the scheduled wake up times (e.g., T1, T2, . . . Tn) of other operating systems executing on the SOC, and compute a minimum wake-time value (e.g., Ti). In an aspect, the synchronizing agent may also compute the difference between the preferred wake up time (e.g., T) and the minimum wake-time (e.g., Ti) to arrive at a delayed wake up time (e.g., Td) value, and send the computed difference value (e.g., Td) to the operating system for acceptance. The computed difference value may be a delayed wake up time or an amount of time to delay. In an aspect, the synchronizing agent may send the minimum wake-time (Ti) to the operating system and the operating system may compute a delay associated with the difference between the preferred wake up time (T) and the minimum wake-time (Ti).

In block 310, the operating system may receive a delay value/minimum wake-time from the synchronizing agent. In determination block 312, the operating system may determine if the delay associated with the received/computed delay value (e.g., Td) is acceptable to the operating system's functional performance (e.g., the client's requirements). If the delay is acceptable (determination block 312="Yes"), in block 316, the operating system may set its wake time to the minimum wake-time (e.g., Ti) and enter a low power mode.

If the delay associated with the received delay value/delayed wake up time (e.g., Td) is not acceptable (determination block 312="No"), in block 318, the operating system may inform the synchronizing agent that that the delay is not acceptable and wait for the synchronizing agent to send a new delay value/delay wake-up time. In an aspect, if a response is not received from the synchronizing agent within a predetermined amount of time, the operating system may enter a low power mode for the duration of the preferred wake up time. In an aspect, if a response is not received from the synchronizing agent within a predetermined amount of time, the operating system may remain in an active-idle state until the expiration of the timer or until there are new processes/tasks to execute.

In the various aspects described above, the time values (e.g., T, Ti, Td, T1-Tn, etc.), may be absolute time, relative time, or a combination absolute and relative time (e.g., a specified number of clock cycles after a specified time).

In various aspects, the synchronizing agent may use the combination of the wake up time and tolerance values to compute a minimum wake-time value (e.g., Ti) without querying or re-querying the individual cores and/or operating systems.

Figure 4:
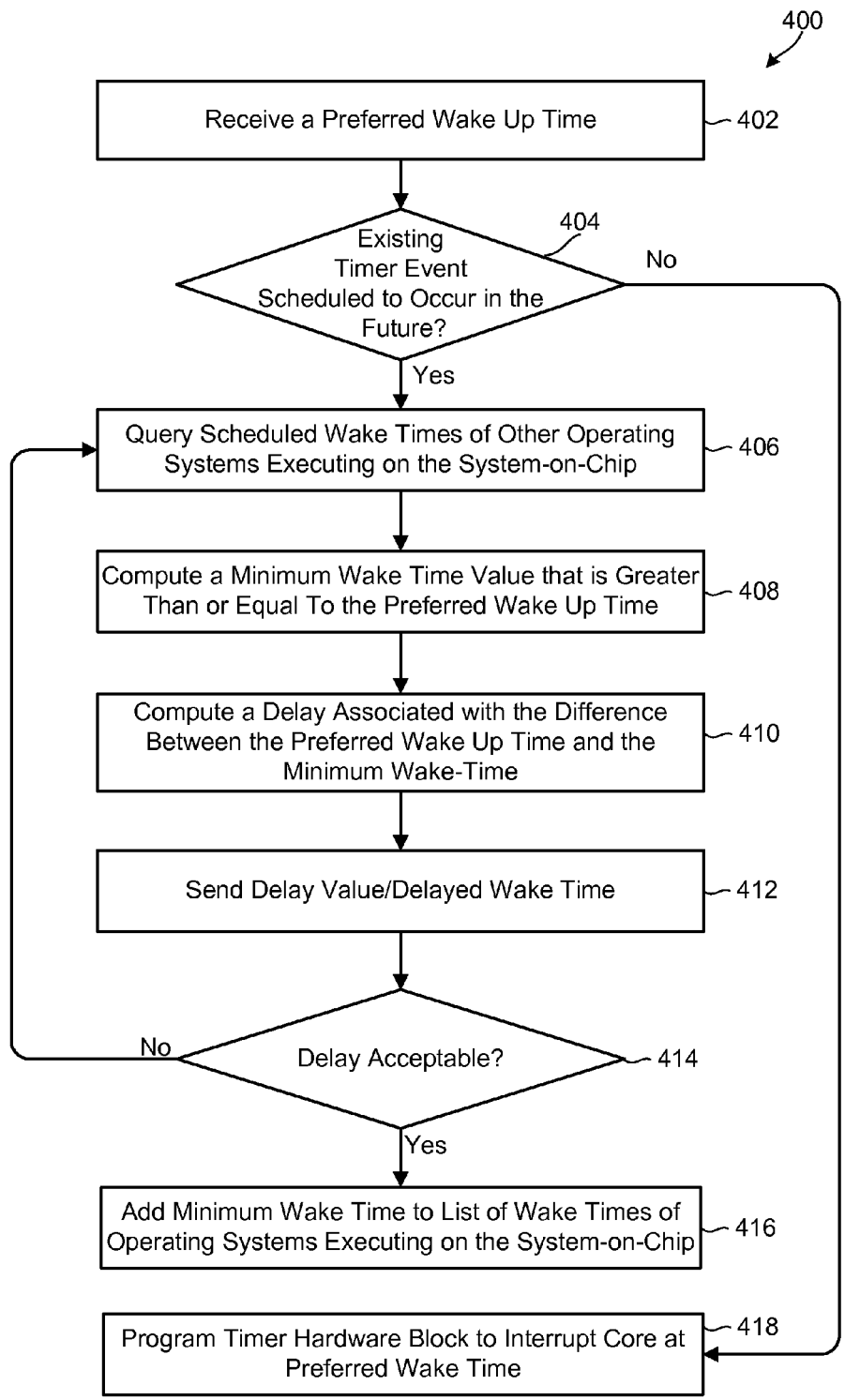
FIG. 4 is a process flow diagram of an aspect synchronizing agent method for coordinating wake up times between different asynchronous operating systems executing on the same multiprocessor hardware.

FIG. 4 illustrates an aspect synchronizing agent method 400 for coordinating wake up times among different asynchronous operating systems executing on the same SOC/multicore processor. As discussed above, an operating system may calculate a preferred wake up time (e.g., time T) at which the operating system desires to be woken up (e.g., receive an interrupt) from a low power mode and notify a synchronizing agent of the calculated preferred wake time. In block 402, the synchronizing agent may receive a preferred wake up time (e.g., time T) value from an asynchronous operating system of the SOC/multicore processor. In determination block 404, the synchronizing agent may determine if there are any existing relevant timer events scheduled for the future. If there are no existing timer events scheduled (determination block 404="No"), in block 418, the synchronizing agent may program a timer hardware block to interrupt the core corresponding to the requesting operating system at the preferred wake up time (e.g., time requested by a client application of the sending operating system). The synchronizing agent may also instruct the operating system's core to enter into a low power state unit the expiration of the timer set in the timer hardware block (e.g., until an interrupt is received from the timer hardware block). In an aspect, the synchronizing agent's programming of the timer hardware block may include instructing the operating system to program the timer hardware block. In an aspect, the operating system may be configured to enter a low power state after programming the time hardware block, and remain in the low power state until the expiration of the timer set in the timer hardware block (e.g., until an interrupt is received from the timer hardware block).

If there are timer events scheduled (determination block 404="Yes"), in block 406, the synchronizing agent may query the scheduled wake up times (e.g., T1, T2, . . . Tn) of other operating systems/cores of the SOC. In block 408, the synchronizing agent may compute a minimum wake-time (e.g., Ti) value that is greater than or equal to the preferred wake up time (e.g., T). For example, the synchronizing agent may determine the minimum wake up time (e.g., Ti) in the set of scheduled wake up times (e.g., {T1 . . . Tn}) that is greater than or equal to the preferred wake up time (e.g., T). In block 410, the synchronizing agent may compute the difference between the preferred wake up time (e.g., T) and the minimum wake-time (e.g., Ti), to arrive at a delayed wake up time (e.g., Td) value. In block 412, the synchronizing agent may send the delayed wake up time (e.g., Td) value to the operating system for approval, instructing the operating system to set its wake time to the minimum wake-time (e.g., Ti) instead of the preferred wake time (T) if the delay is acceptable. The operating system may receive the delayed wake up time (e.g., Td) value, determine if the delay associated with the received delay value (e.g., Td) is acceptable to the operating system's functional performance (e.g., the client's requirements), and notify the synchronizing agent if the delay is acceptable or not.

In determination block 414, the synchronizing agent may determine if a delay associated with the actual wake up time (e.g., Td) is acceptable to the operating system's functional performance. For example, the synchronizing agent may wait a predetermined amount of time for a response from the operating system either confirming acceptance of the delay value or requesting a new delay value. If the delay is not acceptable to the operating system (determination block 414="No"), in block 406, the synchronizing agent may again query the scheduled wake up times (e.g., T1, T2, . . . Tn) of other operating systems/cores of the SOC. If the delay is acceptable to the operating system (determination block 414="Yes"), the synchronizing agent may add the minimum wake-time (e.g., Ti) to the list of wake times of operating system executing on the SOC.

In the various aspects, the extent to which a timer can be delayed may be calculated as a function of the real-time requirements of the operating system and/or scheduled operations. The operating systems may include "lazy" timers and the operating systems may not strictly require to be woken up at the preferred time (e.g., T) to honor an event. Also, certain software tasks may have flexibility in terms of the time they are required to be executed. Various aspects may compute an optimal sleep time that allows more delay in the wake up time of one or more of the cores, improving the likelihood of synchronizing cores and enabling more power savings.

The various aspects may add a measure of synchronization in what would otherwise be an unsynchronized system by having a synchronizing agent that is able to track the wake up times of the different asynchronous operating systems executing on different cores of the same SOC, and using opportunities to delay the wake up of some cores when such a delay is acceptable in order to synchronize the SOC wake up to the earliest un-moveable time.

Figure 5:
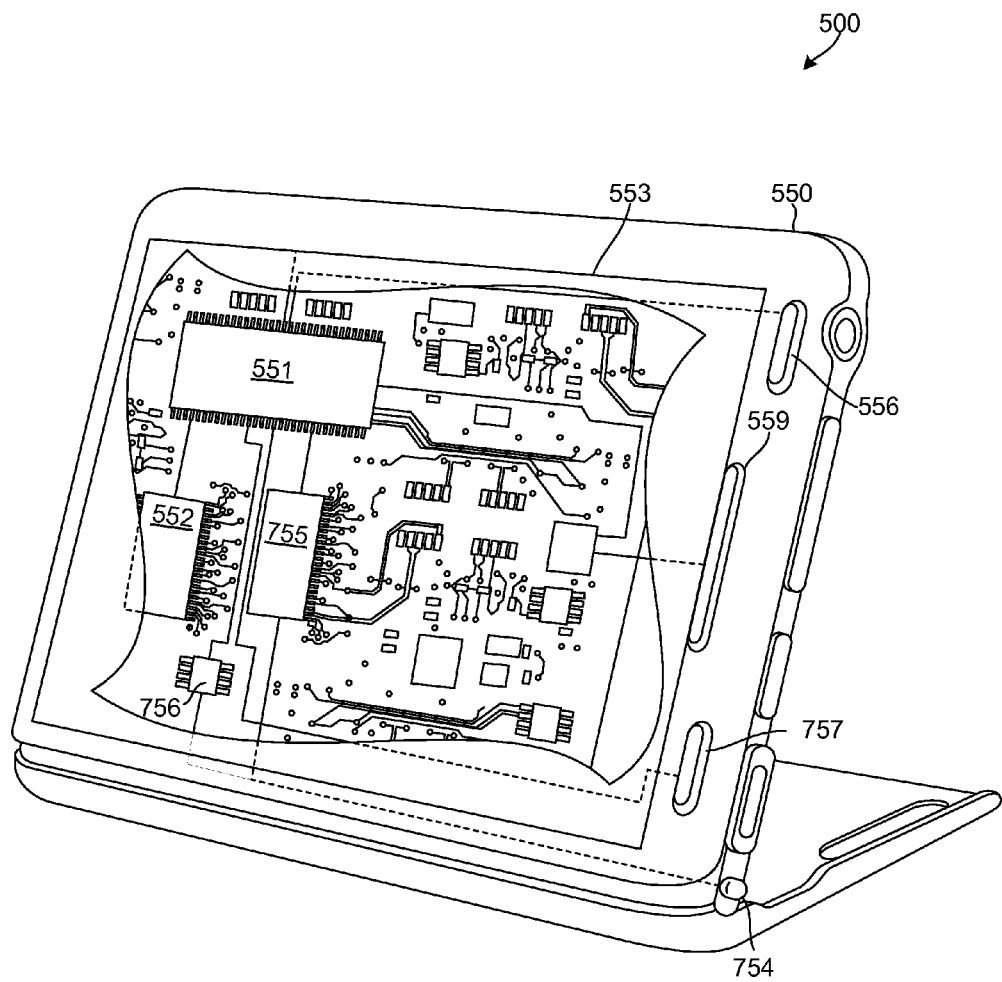
FIG. 5 is a component block diagram of a mobile device suitable for use in an aspect.

Typical mobile devices 550 suitable for use with the various aspects will have in common the components illustrated in FIG. 5. For example, an exemplary mobile receiver device 550 may include a processor 551 coupled to internal memory 552, a display 553, and to a speaker 559. Additionally, the mobile device 550 may have an antenna 554 for sending and receiving electromagnetic radiation that is connected to a mobile multimedia receiver 556 coupled to the processor 551. In some aspects, the mobile multimedia receiver 556 may include an internal processor 558, such as a digital signal processor (DSP) for controlling operations of the receiver 556 and communicating with the device processor 551. Mobile devices typically also include a key pad 556 or miniature keyboard, and menu selection buttons or rocker switches 557 for receiving user inputs.

The processor 551 may be any programmable microprocessor, microcomputer or multiple processor chip or chips that can be configured by processor-executable software instructions (applications) to perform a variety of functions, including the functions of the various aspects described herein. Also, the functions of the various aspects may be implemented in a DSP processor 558 within the receiver 556 configured with DSP-executable instructions. Typically, software applications and processor-executable instructions may be stored in the internal memory 552 before they are accessed and loaded into the processor 551. In some mobile devices, the processor 551 may include internal memory sufficient to store the application software instructions. In some mobile devices, the secure memory may be in a separate memory chip coupled to the processor 551. In many mobile devices 550, the internal memory 552 may be a volatile or nonvolatile memory, such as flash memory, or a mixture of both. For the purposes of this description, a general reference to memory refers to all memory accessible by the processor 551, including internal memory 552, removable memory plugged into the mobile device, and memory within the processor 551 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. An operating system method of conserving energy, comprising:
    determining when the operating system can enter a low power mode;
    calculating a preferred wake up time when the operating system can enter a low power mode;
    sending the calculated preferred wake up time to a synchronizing agent;
    computing in the synchronizing agent a minimum wake-time value that is greater than or equal to the preferred wake up time;
    receiving the minimum wake-time value from the synchronizing agent;
    computing a delay associated with the difference between the preferred wake up time and the minimum wake-time;
    informing the synchronizing agent if the delay is acceptable to the operating system's functional performance;
    setting a wake time of the operating system to the minimum wake-up time if the delay is acceptable to the operating system's functional performance; and
    entering a low power mode for the minimum wake-up time.

2. The method of claim 1, further comprising:
    receiving instructions from the synchronizing agent to set the wake time to an alternative minimum wake-up time if the delay associated with the computed difference is not acceptable to the operating system's functional performance.

3. The method of claim 2, wherein setting the wake time to the minimum wake-up time synchronizes the wake up times of different asynchronous operating systems executing on different processors of a system-on-chip.

4. The method of claim 3, wherein each of the processors of the system-on-chip operates under a different operating system than each of the other cores the processors.

5. The method of claim 3, wherein each of the processors of the system-on-chip shares at least one resource that binds the processor to operations of at least one other processor.

6. The method of claim 3, wherein a single synchronizing agent synchronizes the wake up times for each of the processors of the system-on-chip.

7. The method of claim 1, wherein setting the wake time to the minimum wake-up time synchronizes the wake up times of different asynchronous operating systems executing on different cores on a multicore processor.

8. The method of claim 1, wherein synchronizing agent is executed on a dedicated resource manager processor.

9. The method of claim 1, wherein synchronizing agent is distributed across two or more processors and accesses a data structure shared by the two or more processors.

10. The method of claim 9, wherein each core of the multicore processor operates under a different operating system than each of the other cores the multicore processor.

11. The method of claim 9, wherein each core of the multicore processor shares at least one resource that binds the core to operations of at least one other core.

12. A multiprocessor device comprising two or processor cores, wherein at least one processor core is configured with processor-executable instructions to perform operations comprising:
    determining when an operating system can enter a low power mode;
    calculating a preferred wake up time when the operating system can enter a low power mode;
    sending the calculated preferred wake up time to a synchronizing agent;
    receiving a minimum wake-time value from the synchronizing agent;
    computing a delay associated with the difference between the preferred wake up time and the minimum wake-time;
    informing the synchronizing agent if the delay is acceptable to the operating system's functional performance;
    setting a wake time of the operating system to the minimum wake-up time if the delay is acceptable to the operating system's functional performance; and
    entering a low power mode for the minimum wake-up time.

13. The multiprocessor device of claim 12, wherein the at least one processor core is configured with processor-executable instructions to perform operations further comprising:
    receiving instructions from the synchronizing agent to set the wake time to an alternative minimum wake-up time if the delay associated with the computed difference is not acceptable to the operating system's functional performance.

14. The multiprocessor device of claim 13, wherein the multiprocessor device is a system-on-chip and the at least one processor core is configured with processor-executable instructions to perform operations such that setting the wake time to the minimum wake-up time synchronizes the wake up times of different asynchronous operating systems executing on different processor cores of the system-on-chip.

15. The multiprocessor device of claim 12, further comprising:
    a dedicated resource manager processor, wherein the dedicated resource manager processor is configured with processor-executable instructions to perform operations comprising:
        querying scheduled wake times of different asynchronous operating systems executing on different processing cores; and
        computing a minimum wake-time value that is greater than or equal to the preferred wake up time.

16. The multiprocessor device of claim 12, further comprising a memory shared by the two or more processor cores, wherein at least one processor core is configured with processor-executable instructions to perform operations such that the synchronizing agent is distributed across the two or more processor cores.

17. The multiprocessor device of claim 12, wherein the multiprocessor device is a multicore processor and the at least one processor core is configured with processor-executable instructions to perform operations such that setting the wake time to the minimum wake-up time synchronizes the wake up times of different asynchronous operating systems executing on different processing cores of the multicore processor.

18. The multiprocessor device of claim 17, wherein each core of the multicore processor operates under a different operating system than each of the other cores of the multicore processor.

19. The multiprocessor device of claim 18, wherein each of the processing cores of the system-on-chip operates under a different operating system than each of the other processor cores.

20. The multiprocessor device of claim 18, wherein each of the processor cores of the system-on-chip shares at least one resource that binds the processor core to operations of at least one other processor core.

21. The multiprocessor device of claim 18, wherein at least one processor core is configured with processor-executable instructions to perform operations such that a single synchronizing agent synchronizes the wake up times for each of the processor cores of the system-on-chip.

22. The multiprocessor device of claim 17, wherein each core of the multicore processor shares at least one resource that binds the core to operations of at least one other core.

23. A multiprocessor device, comprising:
    means for determining when an operating system can enter a low power mode;
    means for calculating a preferred wake up time when the operating system can enter a low power mode;
    means for sending the calculated preferred wake up time to a synchronizing agent;
    means for computing in the synchronizing agent a minimum wake-time value that is greater than or equal to the preferred wake up time;
    means for receiving the minimum wake-time value from the synchronizing agent;
    means for computing a delay associated with the difference between the preferred wake up time and the minimum wake-time;
    means for informing the synchronizing agent if the delay is acceptable to the operating system's functional performance;
    means for setting a wake time of the operating system to the minimum wake-up time if the delay is acceptable to the operating system's functional performance; and
    means for entering a low power mode for the minimum wake-up time.

24. The multiprocessor device of claim 23, further comprising:
    means for receiving instructions from the synchronizing agent to set the wake time to an alternative minimum wake-up time if the delay associated with the computed difference is not acceptable to the operating system's functional performance.

25. The multiprocessor device of claim 24, wherein means for setting the wake time to the minimum wake-up time comprises means for synchronizing the wake up times of different asynchronous operating systems executing on different processors of a system-on-chip.

26. The multiprocessor device of claim 25, further comprising means for executing a different operating system on each processor of the system-on-chip.

27. The multiprocessor device of claim 25, further comprising means for sharing at least one resource between two or more processors of the system-on-chip such that the resource binds at least one processor of the system-on-chip to operations of at least one other processor.

28. The multiprocessor device of claim 25, further comprising means for executing a single synchronizing agent that synchronizes the wake up times for each of the processors of the system-on-chip.

29. The multiprocessor device of claim 23, further comprising means for executing the synchronizing agent on a dedicated resource manager processor.

30. The multiprocessor device of claim 23, further comprising:
means for storing a data structure shared by the two or more processors; and
means for distributing synchronizing agent operations across two or more processors.

31. The multiprocessor device of claim 23, wherein means for setting the wake time to the minimum wake-up time comprises means for synchronizing the wake up times of different asynchronous operating systems executing on different cores on a multicore processor.

32. The multiprocessor device of claim 31, further comprising means for executing a different operating system on each core of the multicore processor.

33. The multiprocessor device of claim 31, further comprising means for sharing at least one resource between two or more cores such that the resource binds at least one core to operations of at least one other core.

34. A non-transitory processor-readable storage medium having stored thereon processor-executable software instructions configured to cause a processor of a multiprocessor device to perform operations for conserving energy, the operations comprising:
determining when an operating system can enter a low power mode;
calculating a preferred wake up time when the operating system can enter a low power mode;
sending the calculated preferred wake up time to a synchronizing agent that queries scheduled wake times of other operating systems and computes a minimum wake-time value that is greater than or equal to the preferred wake up time;
receiving the minimum wake-time value from the synchronizing agent;
computing a delay associated with the difference between the preferred wake up time and the minimum wake-time;
informing the synchronizing agent if the delay is acceptable to the operating system's functional performance;
setting a wake time of the operating system to the minimum wake-up time if the delay is acceptable to the operating system's functional performance; and
entering a low power mode for the minimum wake-up time.

35. The non-transitory processor-readable storage medium of claim 34, wherein the stored processor-executable software instructions are configured to cause a processor of a multiprocessor device to perform operations further comprising:
receiving instructions from the synchronizing agent to set the wake time to an alternative minimum wake-up time if the delay associated with the computed difference is not acceptable to the operating system's functional performance.

36. The non-transitory processor-readable storage medium of claim 35, wherein the stored processor-executable software instructions are configured to cause a processor of a multiprocessor device to perform operations such that setting the wake time to the minimum wake-up time synchronizes the wake up times of different asynchronous operating systems executing on different processors of a system-on-chip.

37. The non-transitory processor-readable storage medium of claim 36, wherein the stored processor-executable software instructions are configured to cause a processor of a multiprocessor device to perform operations such that energy is conserved in configurations in which each of the processors of the system-on-chip operates under a different operating system than each of the other cores the processors.

38. The non-transitory processor-readable storage medium of claim 36, wherein the stored processor-executable software instructions are configured to cause a processor of a multiprocessor device to perform operations such that energy is conserved in configurations in which each of the processors of the system-on-chip shares at least one resource that binds the processor to operations of at least one other processor.

39. The non-transitory processor-readable storage medium of claim 36, wherein the stored processor-executable software instructions are configured to cause a processor of a multiprocessor device to perform operations such that a single synchronizing agent synchronizes the wake up times for each of the processors of the system-on-chip.

40. The non-transitory processor-readable storage medium of claim 34, wherein the stored processor-executable software instructions are configured to cause a processor of a multiprocessor device to perform operations such that the synchronizing agent is executed on a dedicated resource manager processor.

41. The non-transitory processor-readable storage medium of claim 34, wherein the stored processor-executable software instructions are configured to cause a processor of a multiprocessor device to perform operations such that the synchronizing agent is distributed across two or more processors and accesses a data structure shared by the two or more processors.

42. The non-transitory processor-readable storage medium of claim 34, wherein the stored processor-executable software instructions are configured to cause a processor of a multiprocessor device to perform such that setting the wake time to the minimum wake-up time synchronizes the wake up times of different asynchronous operating systems executing on different cores on a multicore processor.

43. The non-transitory processor-readable storage medium of claim 42, wherein the stored processor-executable software instructions are configured to cause a processor of a multiprocessor device to perform operations such that energy is conserved in configurations in which each core of the multicore processor operates under a different operating system than each of the other cores the multicore processor.

44. The non-transitory processor-readable storage medium of claim 42, wherein the stored processor-executable software instructions are configured to cause a processor of a multiprocessor device to perform operations such that energy is conserved in configurations in which each core of the multicore processor shares at least one resource that binds the core to operations of at least one other core.

* * * * *